US007381341B2

(12) United States Patent
Shimada et al.

(10) Patent No.: US 7,381,341 B2
(45) Date of Patent: Jun. 3, 2008

(54) METHOD OF MANUFACTURING LIQUID JET HEAD

(75) Inventors: Masato Shimada, Nagano-ken (JP); Tetsushi Takahashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 11/037,137

(22) Filed: Jan. 19, 2005

(65) Prior Publication Data

US 2005/0185025 A1 Aug. 25, 2005

Related U.S. Application Data

(63) Continuation-in-part of application No. 10/612,411, filed on Jul. 3, 2003, now abandoned.

(30) Foreign Application Priority Data

Jul. 4, 2002 (JP) ............................ 2002-196288
Jul. 5, 2002 (JP) ............................ 2002-197337
Jul. 3, 2003 (JP) ............................ 2003-191367

(51) Int. Cl.
*G01D 15/00* (2006.01)
*G11B 5/127* (2006.01)

(52) U.S. Cl. .......................... 216/27; 438/21; 29/890.1

(58) Field of Classification Search .................. 216/27; 438/21; 29/890.1; 347/68, 72
See application file for complete search history.

(56) References Cited

U.S. PATENT DOCUMENTS 5,922,218 A 7/1999 Miyata et al.
5,956,829 A 9/1999 Kitahara et al.
6,109,736 A 8/2000 Miyata et al.
6,332,254 B1 12/2001 Usui et al.
6,334,244 B2 1/2002 Hashizume
6,345,424 B1 2/2002 Hasegawa et al.
6,382,781 B2 5/2002 Furuhata et al.

FOREIGN PATENT DOCUMENTS

| | | | | |
|---|---|---|---|---|
| JP | 5-286131 | A | | 11/1993 |
| JP | 2002-36547 | A | | 2/2002 |
| JP | 2002036547 | A | * | 2/2002 |
| JP | 2002-096480 | A | | 4/2002 |
| JP | 2003-133610 | A | | 5/2003 |

* cited by examiner

*Primary Examiner*—Roberts Culbert
(74) *Attorney, Agent, or Firm*—Sughrue Mion, PLLC

(57) ABSTRACT

Disclosed is a method of manufacturing a liquid jet head, which enables a passage-forming substrate to be easily handled, thus realizing good formation of pressure generating chambers and an improvement in manufacturing efficiency. The method includes the steps of: forming a vibration plate and piezoelectric elements on one surface of the passage-forming substrate; thermally adhering a reinforcing substrate for reinforcing the rigidity of the passage-forming substrate, onto the passage-forming substrate; processing the passage-forming substrate to have a predetermined thickness; depositing an insulation film on other surface of the passage-forming substrate at lower temperature than that for adhering the passage-forming substrate and the reinforcing substrate, and patterning the insulation film into a predetermined shape; and etching the passage-forming substrate using the patterned insulation film as a mask to form the pressure generating chambers. Thus, handling of the passage-forming substrate becomes easy, and the pressure generating chambers can be formed with high precision.

17 Claims, 10 Drawing Sheets

METHOD OF MANUFACTURING LIQUID JET HEAD

CROSS-REFERENCE TO RELATED APPLICATION

This application is a Continuation-in-Part of application Ser. No. 10/612,411, filed Jul. 3, 2003 now abandoned.

BACKGROUND OF THE INVENTION

1. Field of the Invention

The present invention relates to a method of manufacturing a liquid jet head which ejects jet liquid and, more particularly, to a method of manufacturing an ink-jet recording head which ejects ink droplets from nozzle orifices by pressurizing ink supplied within pressure generating chambers communicating with the nozzle orifices for ejecting ink droplets, through piezoelectric elements or heater elements.

2. Description of the Related Art

In an ink-jet recording head, part of each pressure generating chamber, which communicates with each nozzle orifice for ejecting ink droplets, is composed of a vibration plate, and this vibration plate is deformed by piezoelectric elements to pressurize ink within the pressure generating chambers, and thus ink droplets are ejected from the nozzle orifices. For such an ink-jet recording head, the following two types of ink-jet recording heads have been put into practical use: one using a piezoelectric actuator of a longitudinal vibration mode, which extends and contracts in an axial direction of a piezoelectric element; and one using a piezoelectric actuator of a flexure vibration mode.

The former can change the volume of each pressure generating chamber by allowing an end face of the piezoelectric element to abut on the vibration plate and can be manufactured as a head suitable for high-density printing. However, a difficult process is required that the piezoelectric element is cut into a comb-teeth shape to make the piezoelectric element coincide with an array pitch of the nozzle orifices. Moreover, work of aligning the cut piezoelectric elements with the pressure generating chambers and fixing the piezoelectric elements thereto is required. Thus, there has been a problem that a manufacturing process thereof is complicated.

On the other hand, in the latter, the piezoelectric elements can be fabricated on the vibration plate by a relatively simple process of attaching a green sheet, that is a piezoelectric material, to the vibration plate in accordance with shapes of the pressure generating chambers and performing baking thereof. Nevertheless, a certain area is required because of the use of flexure vibration. Thus, there has been a problem that high-density arrangement is difficult.

Meanwhile, in order to resolve the disadvantage of the latter recording head, a proposal has been made in which a uniform piezoelectric material layer is formed over the entire surface of the vibration plate by use of a deposition technology, and then this piezoelectric material layer is cut into pieces having a shape corresponding to each of the pressure generating chambers by use of a lithography method, thus forming piezoelectric elements so as to be independent for the respective pressure generating chambers (for example, refer to Japanese Patent Laid-Open No. Hei 5 (1993)-286131).

Accordingly, work of attaching the piezoelectric elements to the vibration plate is no longer required, and the piezoelectric elements can be fabricated with high density by use of a precise and simple method such as the lithography method. In addition, there is an advantage that a thickness of each piezoelectric element can be reduced and thus high-speed drive becomes possible.

In the case of arranging the piezoelectric elements with high density as described above, it is required to ensure rigidity of compartment walls which define the pressure generating chambers, by forming a passage-forming substrate to be relatively thin. However, since the passage-forming substrate is formed using a silicon wafer with a size of, for example, about 6 to 12 inches in diameter, reducing the thickness of the silicon wafer easily causes cracks or the like. Therefore, there has been a problem that handling of the passage-forming substrate is difficult.

Moreover, there is another proposal regarding a method of forming a piezoelectric element and the like while rigidity of a passage-forming substrate is ensured by joining a sacrificial wafer to one surface of the passage-forming substrate (silicon wafer) (for example, refer to Japanese Patent Laid-Open No. 2003-133610). However, this manufacturing method using the sacrificial wafer has the following problems: the passage-forming substrate cannot be well positioned; positioning of the passage-forming substrate is time-consuming and, at the same time, a positioning process is required; and cracks occur in the periphery of the passage-forming substrate to which the sacrificial wafer is joined in the manufacturing process.

These problems can be seen not only in the case of the ink-jet recording head which ejects ink, but in a method of manufacturing another liquid jet head which ejects liquid other than ink, as a matter of course.

SUMMARY OF THE INVENTION

An object of the present invention, in light of the aforementioned circumstances, is to provide a method of manufacturing a liquid jet head. This method enables a passage-forming substrate to be easily handled, thus realizing good formation of the pressure generating chambers and an improvement in manufacturing efficiency.

A first aspect of the present invention to attain the above-mentioned object is a method of manufacturing a liquid jet head including a passage-forming substrate and piezoelectric elements. The passage-forming substrate is made of a single crystal silicon substrate and has pressure generating chambers defined therein which communicate with nozzle orifices. Each of the piezoelectric elements is provided on the passage-forming substrate through a vibration plate, and includes a lower electrode, a piezoelectric layer and an upper electrode. The method is characterized by including the steps of: forming the vibration plate and the piezoelectric elements on one surface of the passage-forming substrate; thermally adhering onto the passage-forming substrate a reinforcing substrate for reinforcing the rigidity of the passage-forming substrate; processing the passage-forming substrate to have a predetermined thickness; depositing an insulation film on the other surface of the passage-forming substrate at lower temperature than that for adhering the passage-forming substrate and the reinforcing substrate, and patterning the insulation film into a predetermined shape; and etching the passage-forming substrate using the patterned insulation film as a mask to form the pressure generating chambers.

In the first aspect, defective adhesion of the passage-forming substrate and the reinforcing substrate does not occur when forming the insulation film. Therefore, good formation of the pressure generating chambers is realized even though a thinning process of the passage-forming substrate is performed after the reinforcing substrate is adhered to the passage-forming substrate.

A second aspect of the present invention is the method of manufacturing a liquid jet head according to the first aspect, characterized in that a piezoelectric element holding portion, which is capable of reserving a space large enough not to hinder the motion of the piezoelectric elements, is formed in an area facing the piezoelectric elements on the reinforcing substrate.

In the second aspect, by using the reinforcing substrate having the piezoelectric element holding portion, the reinforcing substrate can be formed so that the reinforcing substrate is the same size as the passage-forming substrate, thereby enabling the rigidity of the passage-forming substrate to be reinforced securely by the reinforcing substrate.

A third aspect of the present invention is the method of manufacturing a liquid jet head according to the second aspect, characterized in that the reinforcing substrate causes the piezoelectric element holding portion to seal the piezoelectric elements.

In the third aspect, since the piezoelectric elements are sealed by the piezoelectric element holding portion, deterioration (destruction) of the piezoelectric layer (piezoelectric elements) due to moisture (damp) can be prevented.

A fourth aspect of the present invention is the method of manufacturing a liquid jet head according to any one of the first to third aspects, characterized in that the step of forming the piezoelectric elements includes a step of covering the piezoelectric elements with an insulation film made of an inorganic insulating material.

In the fourth aspect, since the piezoelectric layer is covered with an insulation film made of an inorganic insulating material having a low rate of water permeability, deterioration (destruction) of the piezoelectric layer (piezoelectric elements) due to moisture (damp) can be prevented securely for a long time.

A fifth aspect of the present invention is the method of manufacturing a liquid jet head according to any one of the first to fourth aspects, characterized in that a reservoir part to constitute parts of a reservoir which is a liquid chamber is shared by all the pressure generating chambers.

In the fifth aspect, the reservoir part can be miniaturized by providing the reservoir part to the reinforcing substrate.

A sixth aspect of the present invention is the method of manufacturing a liquid jet head according to any one of the first to the fifth aspect, characterized in that each of the foregoing steps is performed on a single crystal silicon substrate which is to be divided into the passage-forming substrates, and thereafter the substrate is divided.

In the sixth aspect, by performing each of the steps on the single crystal silicon substrate, a plurality of the passage-forming substrates can be simultaneously formed with high precision.

A seventh aspect of the present invention is the method of manufacturing a liquid jet head according to one of the first to sixth aspects, characterized in that an adhesive agent for adhering the passage-forming substrate and the reinforcing substrate is an epoxy-based adhesive agent.

In the seventh aspect, the passage-forming substrate and the reinforcing substrate can be adhered relatively easily, and the piezoelectric element holding portion can be surely sealed.

An eighth aspect of the present invention is the method of manufacturing a liquid jet head according to any one of the first to seventh aspects, characterized in that at least a lowermost layer of the vibration plate is formed of a thermal oxide film, and one surface of each pressure generating chamber includes the thermal oxide film.

In the eighth aspect, the vibration plate can be formed easily by thermal oxidation of the passage-forming substrate.

A ninth aspect of the present invention is the method of manufacturing a liquid jet head according to any one of the first to eighth aspects, characterized in that an ECR sputtering method or an ion assisted deposition method is used in the step of forming the insulation film.

In the ninth aspect, good formation of the insulation film is realized at lower temperature than that for adhering the passage-forming substrate and the reinforcing substrate.

A tenth aspect of the present invention is the method of manufacturing a liquid jet head according to any one of the first to ninth aspects, characterized in that, in the step of forming the pressure generating chambers, part of the passage-forming substrate in a region where the insulation film is formed is removed to form an overhanging portion where the insulation film overhangs in a region corresponding to each of the pressure generating chambers. The method is also characterized by further including the step of removing the overhanging portion after the step of forming the pressure generating chambers.

In the tenth aspect, the pressure generating chambers are made to have a desired shape, thus realizing a smoother flow of jet liquid (liquid). Further, no broken overhanging portions are mixed into the jet liquid, and thereby nozzle blockage and the like can be prevented.

A eleventh aspect of the present invention is the method of manufacturing a liquid jet head according to any one of the first to tenth aspects, characterized in that, any one material of silicon nitride, tantalum oxide, alumina, zirconia, and titania is used as the insulation film.

In the eleventh aspect, by selecting a desired material, good formation of the insulation film is realized at relatively low temperature.

A twelfth aspect of the present invention is the method of manufacturing a liquid jet head according to the eleventh aspect, characterized in that the insulating film is patterned by dry etching using etching gas essentially containing tetrafluoromethane ($CF_4$) or trifluoromethane ($CHF_3$).

In the twelfth aspect, an etched amount of other members can be limited to an extremely small amount when removing the insulation film, and thereby good removal of only the insulation film can be substantially realized. This aspect is particularly advantageous in removing the overhanging portion.

A thirteenth aspect of the present invention is the method of manufacturing a liquid jet head according to any one of the first to twelfth aspects, characterized in that, in the step of processing the passage-forming substrate to have a predetermined thickness, the passage-forming substrate is treated with an etching solution on its other surface opposite to one surface thereof on which the piezoelectric elements are provided, while the passage-forming substrate is rotated in an in-plane direction of the other surface thereof.

In the thirteenth aspect, the passage-forming substrate is treated with the etching solution on the other surface thereof opposite to the piezoelectric element side. Therefore, the etching solution is uniformly spread over the surface of the passage-forming substrate without applying stress to the passage-forming substrate due to grinding or polishing, and thereby the passage-forming substrate is formed to have a uniform thickness. Furthermore, the etching solution is not attached to the side surface of the passage-forming substrate, and excessive etching does not occur in a region of the passage-forming substrate.

A fourtheenth aspect of the present invention is the method of manufacturing a liquid jet head according to the thirteenth aspect, characterized in that, in the step of processing the passage-forming substrate to have the predetermined thickness, the other surface of the passage-forming substrate is treated with the etching solution after being ground or polished.

In the fourteenth aspect, wet etching is performed on the passage-forming substrate after grinding or polishing the passage-forming substrate to the predetermined thickness. Thus, a microcrack formed during grinding or polishing can be surely removed and the passage-forming substrate can be formed to have the predetermined thickness in a short period of time.

An fifteenth aspect of the present invention is the method of manufacturing a liquid jet head according to one of the thirteenth and fourteenth aspects, characterized in that the etching solution is made of hydrofluoric nitric acid.

In the fifteenth aspect, etching is performed with the etching solution made of hydrofluoric nitric acid, and thereby the passage-forming substrate made of the single crystal silicon substrate can be processed to have the predetermined thickness with high precision.

A sixteenth aspect of the present invention is the method of manufacturing a liquid jet head according to any one of the first to fifteenth aspects, characterized by including the step of adhering a nozzle plate, in which nozzle orifices are drilled, to the other surface of the passage-forming substrate in which the pressure generating chambers are formed.

In the sixteenth aspect, good adhesion of the nozzle plate to the passage-forming substrate having a uniform thickness can be realized.

DESCRIPTION OF THE EMBODIMENTS

Each embodiment of the present invention will now be described in detail herein below.

Embodiment 1

Figure 1:
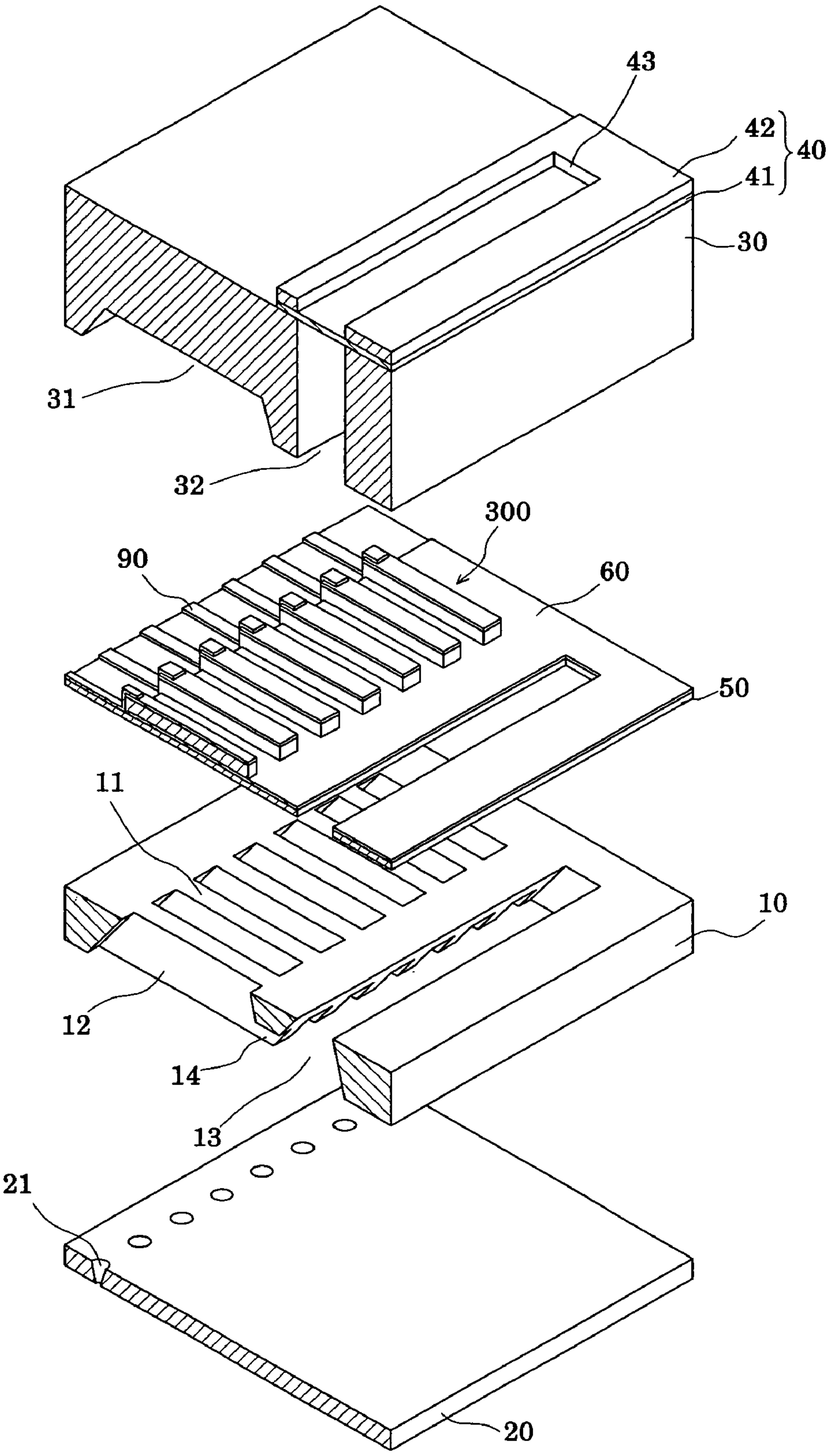
FIG. 1 is a perspective view schematically showing a recording head according to Embodiment 1.
Figure 2A:
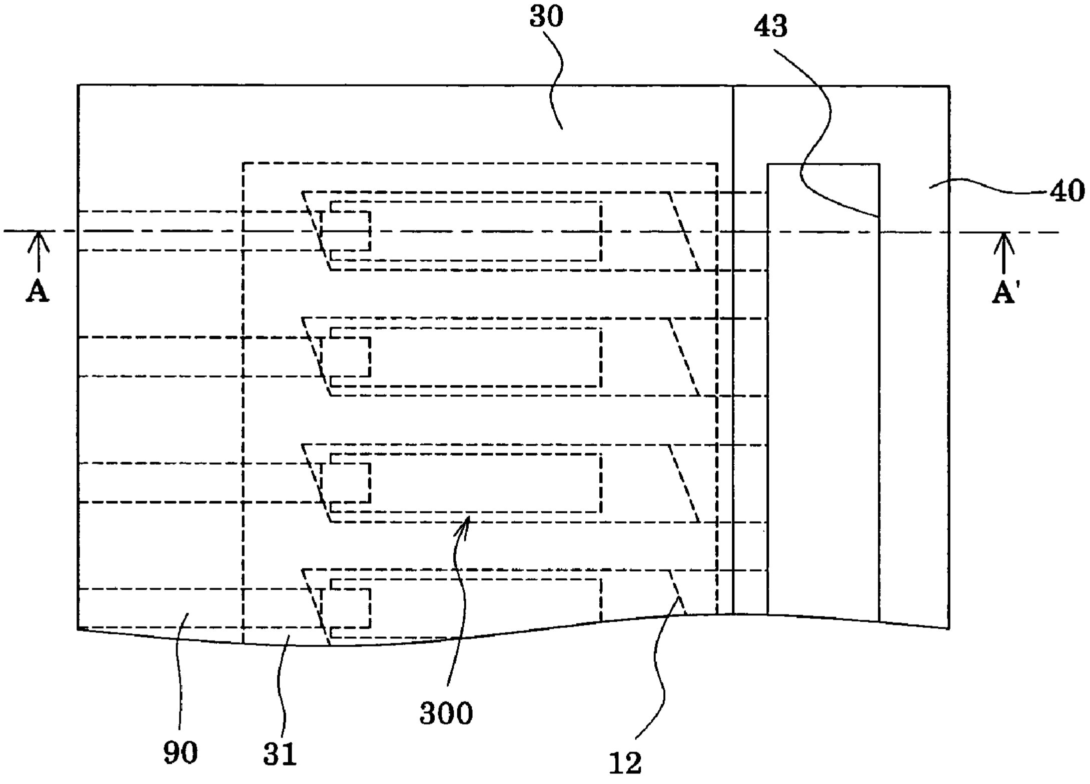
FIGS. 2A and 2B are a plan view and a sectional view of the recording head according to Embodiment 1, respectively.
Figure 2B:
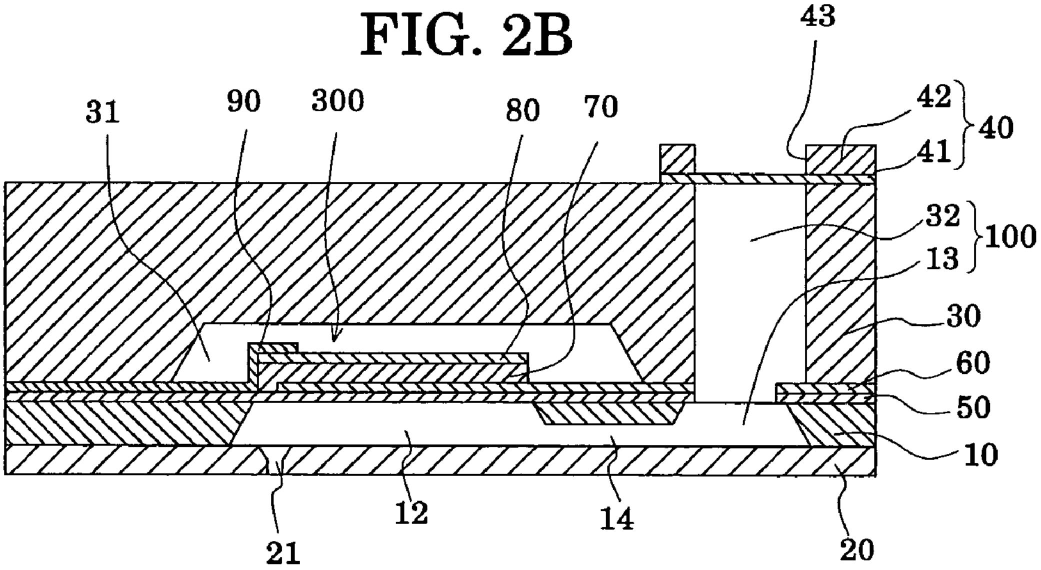

FIG. 1 is an exploded perspective view schematically showing an ink-jet recording head according to Embodiment 1 of the present invention. FIG. 2A is a plan view of FIG. 1, and FIG. 2B is a sectional view taken along the line A-A' of FIG. 2A. As illustrated, a passage-forming substrate 10 is made of a single crystal silicon substrate of plane orientation (110) in this embodiment, and a 1 to 2 μm-thick elastic film 50 made of silicon dioxide is formed beforehand on one surface of the passage-forming substrate 10 by thermal oxidation.

In the passage-forming substrate 10, pressure generating chambers 12, which are defined by a plurality of compartment walls 11, are arrayed in a width direction of the passage-forming substrate 10 by performing anisotropic etching of the single crystal silicon substrate from one surface side thereof. Further, a communicating portion 13 which communicates with a reservoir portion 32 of a reinforcing subtrate 30 to be described later is formed outside the pressure generating chambers 12 in longitudinal directions thereof. The communicating portion 13 communicates with one end portions of the pressure-generating chambers 12 in the longitudinal directions through respective ink supply paths 14.

Here, anisotropic etching is performed by utilizing a difference in an etching rate of the single crystal silicon substrate. For example, in this embodiment, when the single crystal silicon substrate is dipped in an alkaline solution such as KOH, the substrate is gradually eroded and there appear first (111) planes perpendicular to the (110) plane and second (111) planes making about a 70-degree angle with these first (111) planes and about a 35-degree angle with the foregoing (110) plane. The anisotropic etching is performed by utilizing a characteristic that the etching rate of the (111) planes is about 1/180 in comparison with that of the (110) plane. By use of this anisotropic etching, high-precision processing can be performed by taking a depth processing of a parallelogram shape, which is formed by two of the first (111) planes and two of the oblique second (111) planes, as its basis. Thus, the pressure generating chambers 12 can be arrayed with high density.

In this embodiment, long sides of each of the pressure generating chambers 12 are formed of the first (111) planes and short sides thereof are formed of the second (111) planes. These pressure generating chambers 12 are formed by performing etching up to the elastic film 50 while nearly penetrating the passage-forming substrate 10. Here, an extremely small part of the elastic film 50 is eroded by the alkaline solution used in etching the single crystal silicon substrate. Moreover, each of the ink supply paths 14 communicating with the one ends of the respective pressure generating chambers 12 is formed to be shallower than the pressure generating chamber 12, and thus passage resistance of ink flowing into the pressure generating chamber 12 is maintained constant. Specifically, the ink supply paths 14 are formed by performing half-etching of the single crystal silicon substrate in its thickness direction. Note that the half-etching is performed by controlling an etching time.

A thickness of the passage-forming substrate 10, in which the pressure generating chambers 12 as described above and the like are formed, is preferably selected to be optimum in accordance with an array density of the pressure generating chambers 12. For example, in the case of arraying about 180 pressure generating chambers 12 per inch (180 dpi), the thickness of the passage-forming substrate 10 is preferably set to about 180 to 280 μm, more preferably set to about 220

μm. Moreover, in the case of arraying the pressure generating chambers 12 with as relatively high density as, for example, about 360 dpi, the thickness of the passage-forming substrate 10 is preferably set to 100 μm or less. This is because an array density of the pressure generating chambers 12 can be increased while maintaining rigidity of the compartment walls 11 between the pressure generating chambers 12 adjacent to each other. In this embodiment, since the array density of the pressure generating chambers 12 is set to about 360 dpi, the thickness of the passage-forming substrate 10 is set to 70 μm.

Moreover, a nozzle plate 20 having nozzle orifices 21 drilled therein is fixed to the open face side of the passage-forming substrate 10 by use of an adhesive agent, a thermowelding film or the like. The nozzle orifices 21 communicate with the pressure generating chambers 12 on the opposite sides to the ink supply paths 14 of the pressure generating chambers 12.

Meanwhile, on the elastic film 50 on the opposite side to the open face of the passage-forming substrate 10, a lower electrode film 60 having a thickness of, for example, about 0.2 μm, a piezoelectric layer 70 having a thickness of, for example, about 1 μm and an upper electrode film 80 having a thickness of, for example, about 0.1 μm are formed in a process to be described later, thus constituting each piezoelectric element 300. Here, the piezoelectric element 300 means a part including the lower electrode film 60, the piezoelectric layer 70 and the upper electrode film 80. In general, the piezoelectric element 300 is configured by using any one of the electrodes thereof as a common electrode, and patterning the other electrode and the piezoelectric layer 70 for each of the pressure-generating chambers 12. Here, a part which includes the patterned one of the electrodes and piezoelectric layer 70, and in which piezoelectric strain occurs due to voltage application to both the electrodes is called a piezoelectric active portion. In this embodiment, the lower electrode film 60 is used as the common electrode of the piezoelectric element 300, and the upper electrode film 80 is used as an individual electrode thereof. However, even if this order is reversed on account of a drive circuit and wiring, there is no trouble caused thereby. In any case, the piezoelectric active portion is formed for each of the pressure generating chambers. Moreover, herein, the piezoelectric elements 300 and a vibration plate caused displacement by drive of the piezoelectric elements 300 are collectively called a piezoelectric actuator. Note that in the aforementioned example, the lower electrode film 60 of each piezoelectric element 300 and the elastic film 50 act as the vibration plate.

Moreover, to the upper electrode film 80 of each piezoelectric element 300 as described above, a lead electrode 90 made of, for example, gold (Au) is connected. This lead electrode 90 is led from the vicinity of an end in a longitudinal direction of each of the piezoelectric elements 300 and extended to the vicinity of an end of the passage-forming substrate 10. The lead electrode 90 is connected to a drive IC or the like for driving the piezoelectric elements, by wire bonding or the like, which is not shown in the drawing.

A reinforcing subtrate 30 having a piezoelectric element holding portion 31 is joined to the passage-forming substrate 10 on the piezoelectric element 300 side thereof. The piezoelectric element holding portion 31 ensures a space which does not interfere with movement of the piezoelectric elements 300, and can seal the space. The piezoelectric elements 300 are sealed within the piezoelectric element holding portion 31. A material preferably used for this reinforcing substrate 30 is one having substantially the same coefficient of thermal expansion as that of the passage-forming substrate 10, for example, glass, a ceramic material or the like. In this embodiment, the reinforcing substrate 30 is formed of a single crystal silicon substrate, which is the same material as that of the passage-forming substrate 10. Further, the reservoir portion 32 is provided in the reinforcing substrate 30, constituting at least a part of a reservoir 100, which is to be a common ink chamber of each of the pressure generating chambers 12. This reservoir portion 32 communicates with the communicating portion 13 of the passage-forming substrate 10 as described above, thus constituting the reservoir 100 which is to be a common ink chamber of each of the pressure generating chambers 12.

Moreover, a compliance plate 40 including a sealing film 41 and a fixed plate 42 is joined onto the reinforcing substrate 30. The sealing film 41 is made of a flexible material with low rigidity (for example, a polyphenylene sulfide (PPS) film with a thickness of 6 μm). The fixed plate 42 is formed of a hard material such as metal (for example, stainless-steel (SUS) with a thickness of 30 μm). An opening portion 43 is formed by entirely removing the fixed plate 42 in a region corresponding to the reservoir 100, in a thickness direction of the fixed plate 42. Thus, the one surface of the reservoir 100 is sealed only by the flexible sealing film 41.

The ink-jet recording head as described above takes in ink from unillustrated external ink supply means and fills the inside thereof, from the reservoir 100 to the nozzle orifices 21, with ink. Thereafter, in accordance with a recording signal from an unillustrated drive circuit, voltages are applied between the respective lower and upper electrode films 60 and 80 which correspond to the pressure generating chambers 12 through the external wiring, and thereby the elastic film 50, the lower electrode film 60 and the piezoelectric layer 70 are deformed with flexibility. Thus, pressures in the respective pressure generating chambers 12 are increased and ink droplets are ejected from the nozzle orifices 21.

Figure 3A:
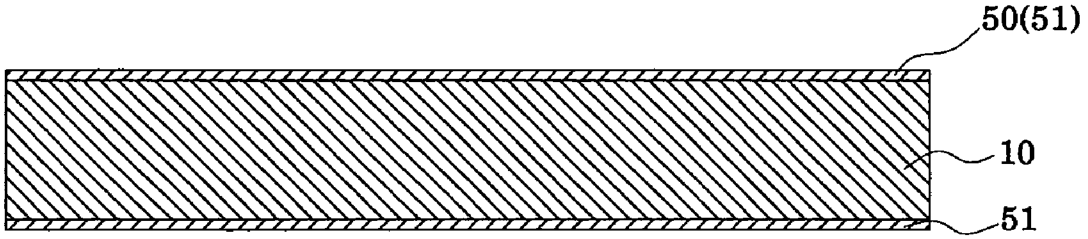
FIGS. 3A to 3D are sectional views showing manufacturing steps of the recording head according to Embodiment 1.

Hereinafter, the manufacturing method of this type of ink-jet recording head according to this embodiment will be described. FIGS. 3A to 4D, and FIGS. 6A to 7B are sectional views of the pressure generating chamber in a longitudinal direction thereof. FIGS. 5A and 5B are perspective views of a wafer used for the passage-forming substrate. First of all, as shown in FIG. 3A, silicon dioxide films 51, one of which is to be the elastic film 50, are formed by thermally oxidizing the surfaces of the passage-forming substrate 10 in a diffusion furnace at about 1100° C.

Figure 3B:
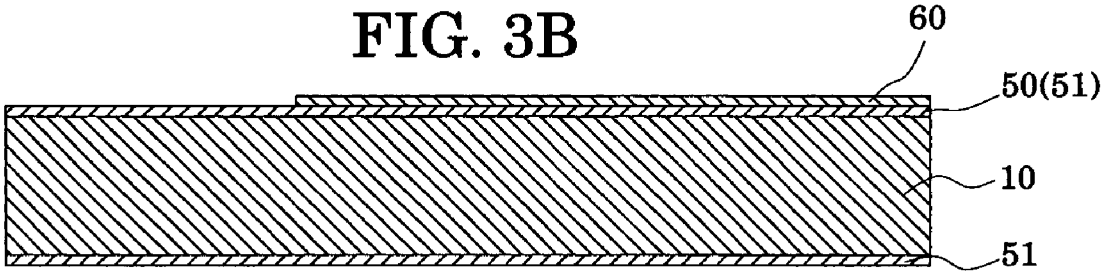

Next, as shown in FIG. 3B, a lower electrode film 60 is formed on the silicon dioxide film 51 (elastic film 50) on one surface of the passage-forming substrate 10 by sputtering. A preferable material of this lower electrode film 60 is platinum (Pt), iridium (Ir) or the like. This is because the later-described piezoelectric layer 70, which is deposited by a sputtering or sol-gel method, is required to be crystallized by being baked after the deposition at a temperature of about 600 to 1000° C. in the ambient atmosphere or in the oxygen atmosphere. Specifically, the material of the lower electrode film 60 must maintain its conductivity in the oxygen atmosphere at such a high temperature. In the case of using lead-zirconate-titanate (PZT) as the piezoelectric layer 70, particularly, it is preferable that there are few changes in conductivity due to diffusion of lead oxide. For these reasons, platinum, iridium or the like is preferable for the material of the lower electrode film 60.

Figure 3C:
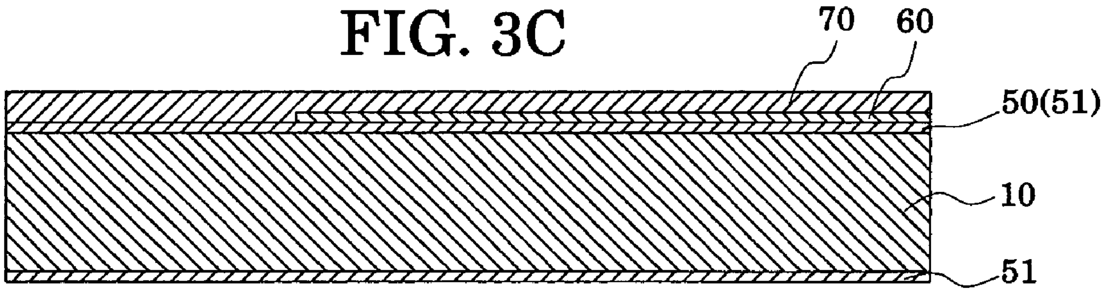

Next, as shown in FIG. 3C, the piezoelectric layer 70 is deposited. This piezoelectric layer 70 preferably has oriented crystals. For example, in this embodiment, a so-called sol, which is obtained by dissolving and dispersing a metal organic matter in a catalyst, is applied and dried to become a gel, and the gel is further baked at a high temperature. Thus, the piezoelectric layer 70 made of a metal oxide is obtained. By being formed using a so-called sol-gel method described above, the piezoelectric layer 70 having oriented crystals is obtained. For a material of the piezoelectric layer 70, a lead zirconate titanate-based material is preferable for use in the ink-jet recording head. It should be noted that a material for the piezoelectric layer 70 is not limited to lead zirconate titanate, and that other piezoelectric materials belonging to relaxor ferroelectrics (for example, PMN-PT, PZN-PT, PNN-PT and the like) may be used for the piezoelectric layer 70. In addition, note that a deposition method of this piezoelectric layer 70 is not particularly limited and, for example, a sputtering method may be used for forming the piezoelectric layer 70.

Furthermore, it is also possible to use a method in which a precursor film of lead-zirconate-titanate is formed by use of the sol-gel method, the sputtering method or the like, and thereafter the film is subjected to crystal growth at a low temperature by use of a high-pressure processing method in an alkaline solution. In any case, the piezoelectric layer 70 thus deposited, unlike a bulk piezoelectric material, has priority orientation of crystals. In addition, the crystals of the piezoelectric layer 70 are formed in a columnar shape in this embodiment. Note that the priority orientation means a state where the crystals are not disorderly oriented but specific crystal planes are directed in an approximately constant direction. Moreover, a thin film having the columnar crystals means a state where the thin film is formed by aggregating approximately columnar crystals across a plane direction of the film while making the central axes of the crystals approximately coincident with each other in a thickness direction of the film. As a matter of course, the thin film may also be formed of granular crystals with priority orientation. The thickness of the piezoelectric layer thus manufactured in a thin-film process is generally 0.2 to 5 μm.

Figure 3D:
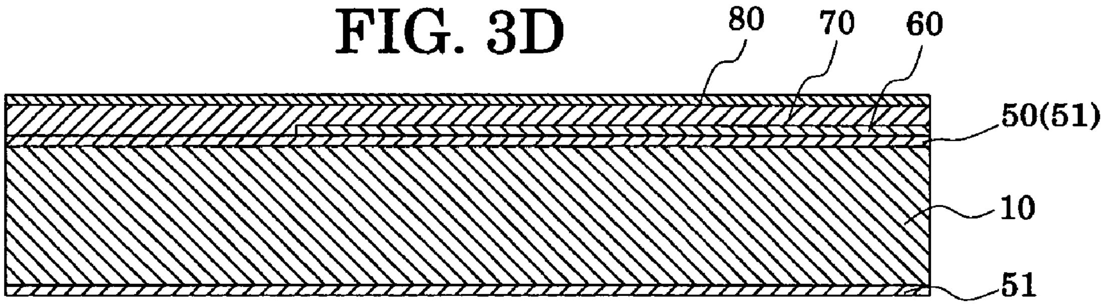

Next, as shown in FIG. 3D, an upper electrode film 80 is deposited. The upper electrode film 80 may be made of a highly-conductive material, and many kinds of metal such as aluminum, gold, nickel, platinum and iridium, a conductive oxide and the like can be used. In this embodiment, platinum is deposited by sputtering.

Figure 4A:
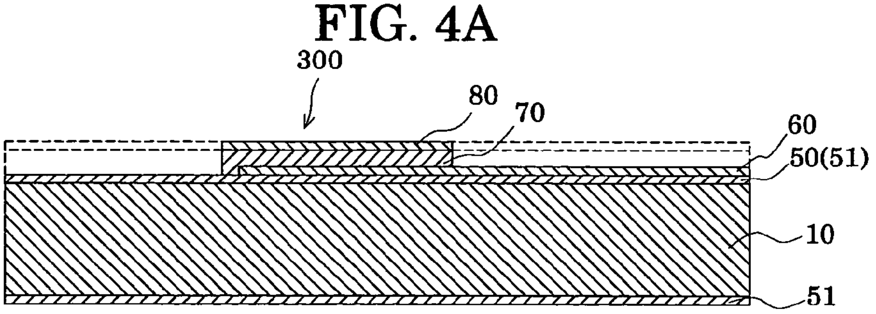
FIGS. 4A to 4D are sectional views showing manufacturing steps of the recording head according to Embodiment 1.
Figure 5A:
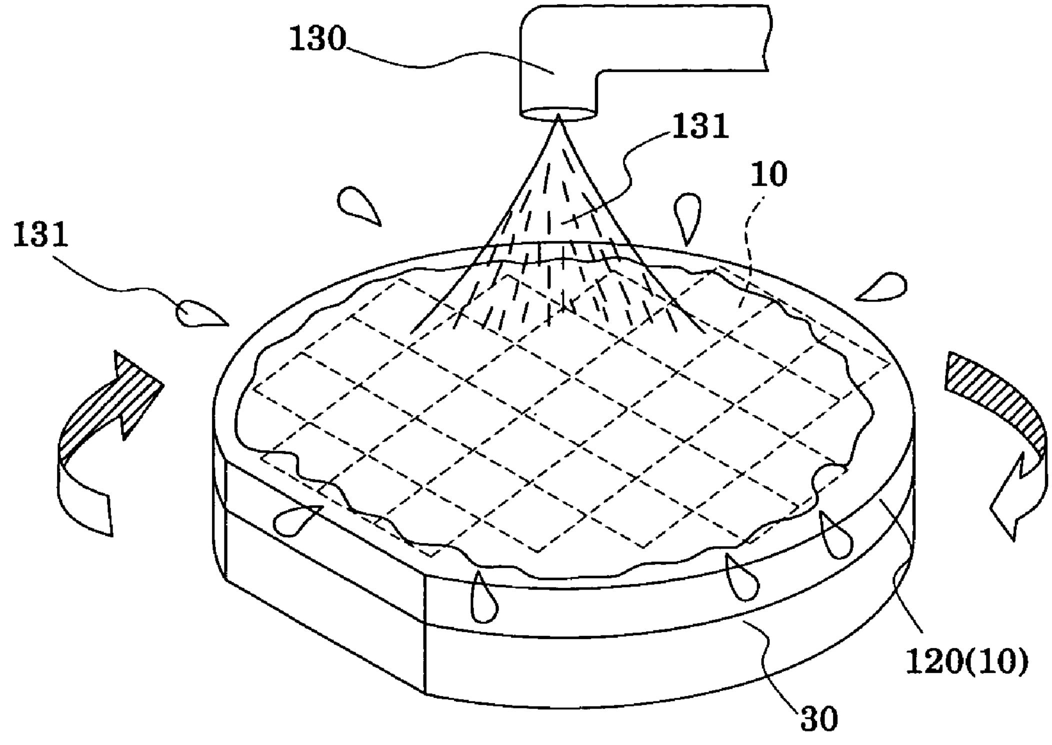
FIGS. 5A and 5B are perspective views of a wafer, showing manufacturing steps according to Embodiment 1.
Figure 5B:
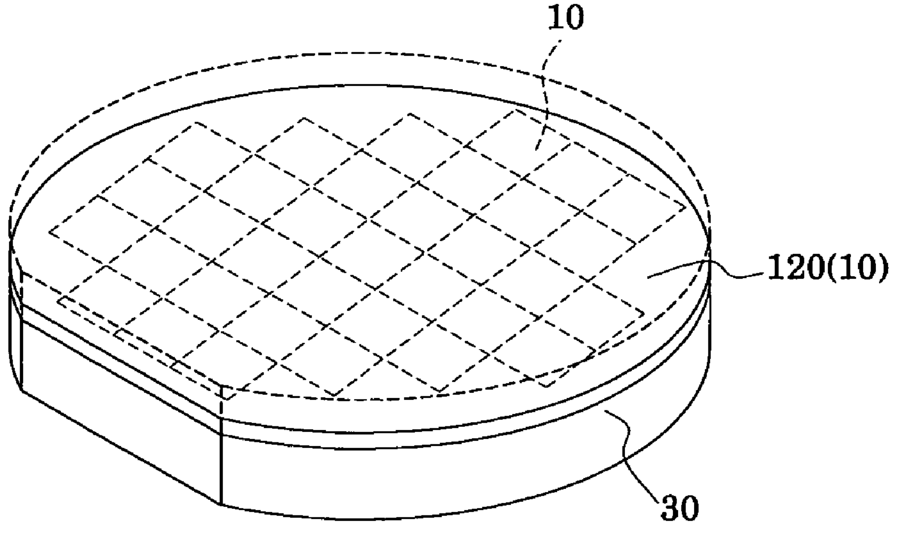

Next, as shown in FIG. 4A, patterning of the piezoelectric elements 300 is performed by etching only the piezoelectric layer 70 and the upper electrode film 80.

Figure 4B:
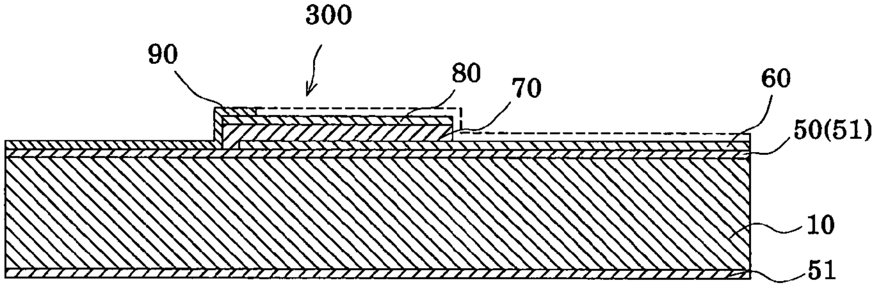

Next, as shown in FIG. 4B, a lead electrode 90 is formed on the entire surface of the passage-forming substrate 10 and patterned for each of the piezoelectric elements 300.

Figure 4C:
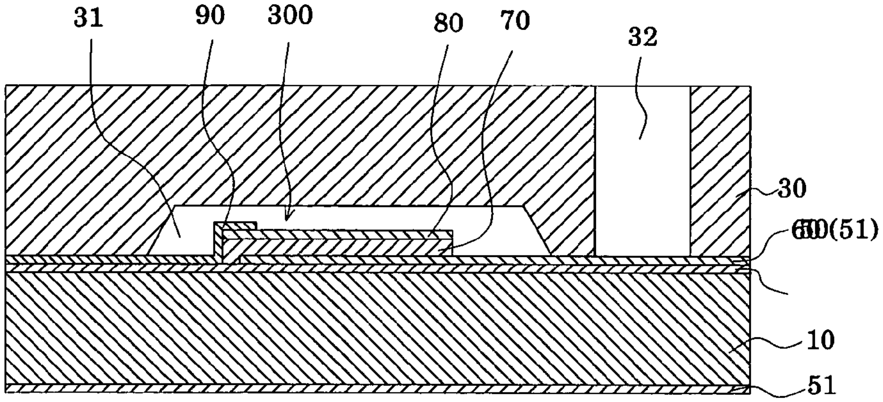

Next, as shown in FIG. 4C, the reinforcing subtrate 30 having the piezoelectric element holding portion 31 for sealing the piezoelectric elements 300 therein is thermally adhered to the piezoelectric element 300 side of the passage-forming substrate 10. An adhesive agent for adhering the passage-forming substrate 10 and the reinforcing subtrate 30 is not particularly limited, but an epoxy-based adhesive agent is used in this embodiment. The adhesive agent is cured by being heated up to approximately 140° C. Since the reinforcing subtrate 30 has a thickness of, for example, about 400 μm, rigidity of the passage-forming substrate 10 is significantly improved by adhering the reinforcing subtrate 30 thereto.

Figure 4D:
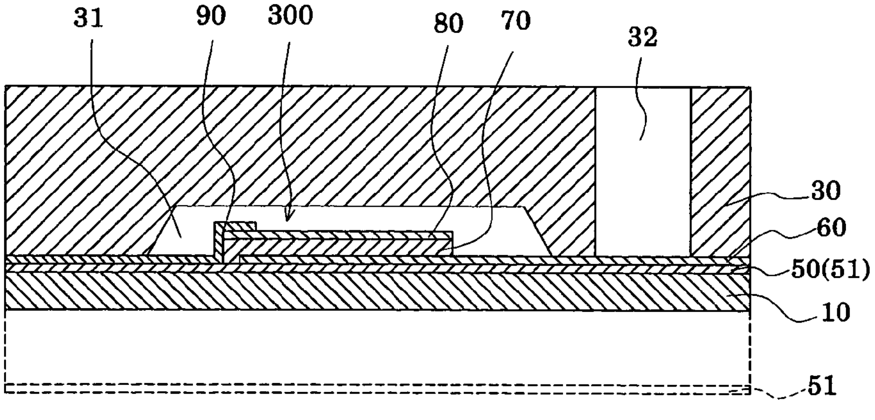

Next, as shown in FIG. 4D, the passage-forming substrate 10 is processed to have a predetermined thickness. In this embodiment, the passage-forming substrate 10 is treated with an etching solution on the other side thereof opposite to the side thereof on which the piezoelectric elements 300 are provided, while the passage-forming substrate 10 is rotated in an in-plane direction of the other side thereof. Thus the passage-forming substrate 10 is formed to have the predetermined thickness.

Moreover, in this embodiment, the silicon dioxide film 51 formed on the surface of the passage-forming substrate 10 is removed by wet etching, and about 220 μm-thick passage-forming substrate 10 is thinned to a thickness of about 70 μm. Note that a method of forming the passage-forming substrate 10 to have a predetermined thickness is not limited to the above, and, for example, the surface of the passage-forming substrate 10 may be grained or polished.

Note that the series, of manufacturing steps described so far are carried out on the single crystal silicon wafer, which is to be divided into the passage-forming substrates 10. Specifically, as shown in FIG. 5A, isotropy etching is performed by spraying an etching solution 131 through an etching solution ejecting nozzle 130 onto an opposite surface of a wafer 120 (10) to a surface thereof on which the piezoelectric elements 300 are provided, while rotating the wafer 120 (10) made of the single crystal silicon substrate, which is to be the passage-forming substrates 10.

During this etching, no stress is applied to the wafer 120 due to graining or polishing. In addition, the etching solution 131 is spread uniformly over the surface of the wafer 120 by a centrifugal force. Accordingly, there is no unevenness in etching amount, and therefore the wafer 120 with a uniform thickness can be realized. Further, the etching solution 131 sprayed on the wafer 120 is scattered off the surface of the wafer 120 by the centrifugal force and does not attach to a side surface of the wafer 120. Therefore, the wafer 120 is not etched from the side surface thereof. By etching the wafer 120 in this way, the wafer 120 comes into the state shown in FIG. 5B. Since the passage-forming substrate 10 is made of the single crystal silicon substrate in this embodiment, hydrofluoric nitric acid is used for the etching solution 131 in the wet etching as described above. Further, in order to spread the etching solution 131 uniformly over the etching surface of the wafer 120, it is preferable to rotate the wafer 120 in an in-plane direction of its etching surface, that is, in an in-plane direction of the surface of the passage-forming substrate 10 (wafer 120) opposite to the surface where the piezoelectric elements 300 are provided.

As described above, by etching the passage-forming substrate 10 while rotating the same, the thin passage-forming substrate 10 having a uniform thickness can be formed. Accordingly, even if the pressure generating chambers 12 are arrayed with high density with thin compartment walls in a subsequent step, compliance is reduced and thus crosstalk can be prevented. Moreover, since the passage-forming substrate 10 is obtained with a uniform thickness without unevenness, a defective junction does not occur when joining the nozzle plate 20 to the passage-forming substrate 10 in a subsequent step. Further, in this embodiment, the passage-forming substrate 10 is formed to have a predetermined thickness only by wet etching. Therefore, formation of an affected layer with a microcrack and the like which easily occur due to grinding or polishing can be reliably prevented.

Figure 6A:
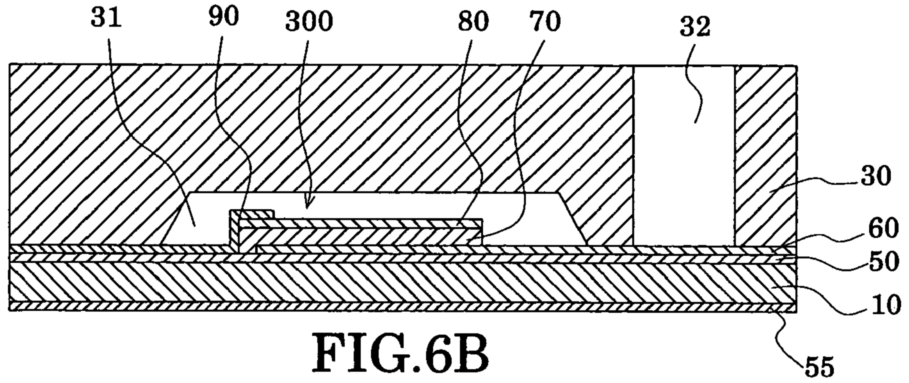
FIGS. 6A to 6D are sectional views showing manufacturing steps of the recording head according to Embodiment 1.

Next, as shown in FIG. 6A, an insulation film 55 is formed on the surface of the passage-forming substrate 10 at lower temperature than that for adhering the passage-forming substrate 10 and the reinforcing subtrate 30, which is 140° C. in this embodiment. A material of the insulation film 55 is not particularly limited, but, for example, silicon nitride, tantalum oxide, alumina, zirconia, or titania is preferably used. In this embodiment, silicon nitride is used. The insulation film 55 may be formed by any method as long as the insulation film 55 can be formed at lower temperature than the predetermined one. The examples of the method are an ion assisted deposition method and an electron cyclotron resonance (ECR) sputtering method. In this embodiment, the ion assisted deposition method is used.

Figure 6B:
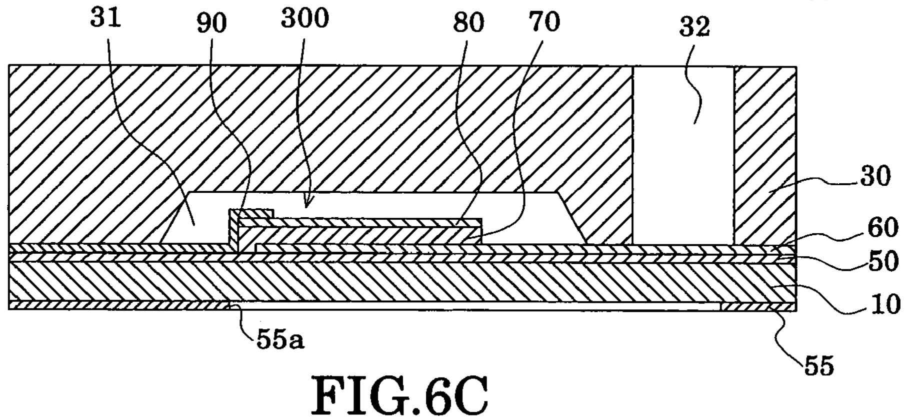

As described above, the insulation film 55 is formed at lower temperature than that for adhering the passage-forming substrate 10 and the reinforcing subtrate 30. This makes it possible to prevent occurrence of defective adhesion between the passage-forming substrate 10 and the reinforcing subtrate 30, damage to the piezoelectric elements 300 and the like due to the heat in forming the insulation film 55. Next, as shown in FIG. 6B, the insulation film 55 is patterned into a predetermine shape by etching. Specifically, an opening portion 55*a* is formed by removing the insulation film 55 in a region where each of the pressure generating chambers 12 is to be formed. A method of etching the insulation film 55 is not particularly limited. In this embodiment, however, dry etching using etching gas which essentially contains tetrafluoromethane ($CF_4$) is selected, since silicon nitride is used for the insulation film 55.

Figure 6C:
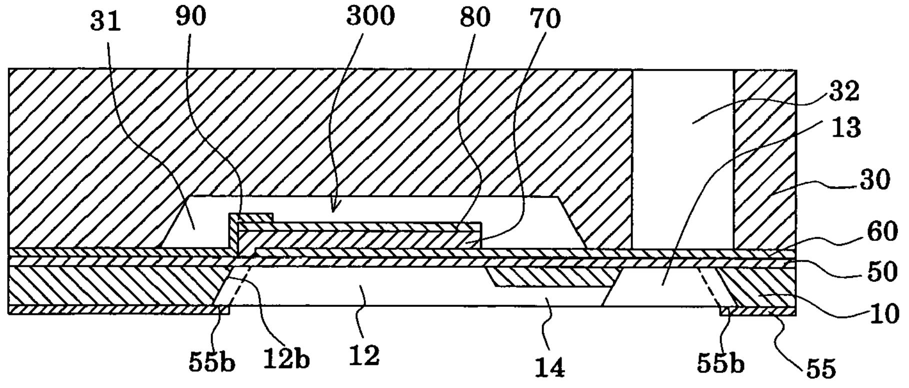
Figure 6D:
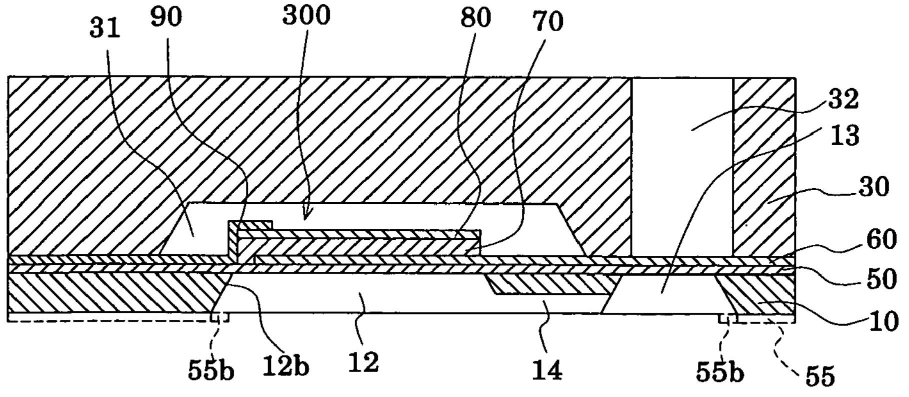

Thereafter, as shown in FIG. 6C, each of the pressure generating chambers 12, the communicating portion 13 and each of the ink supply paths 14 are formed by anisotropic etching of the passage-forming substrate 10 with a potassium hydroxide (KOH) aqueous solution through the opening portion 55*a*, using the insulation film 55 as a mask. Although not illustrated, a protective film is preferably provided on the reinforcing subtrate 30 during anisotropic etching of the passage-forming substrate 10.

In this embodiment, as described in the foregoing, the passage-forming substrate 10 is processed to have a predetermined thickness after the reinforcing subtrate 30 is joined thereto. Therefore, the passage-forming substrate 10 is easily handled. Moreover, after the passage-forming substrate 10 is formed to have the predetermined thickness, the insulation film 55, which is to be the mask for forming the pressure generating chambers 12 and the like, is formed at lower temperature than that for adhering the passage-forming substrate 10 and the reinforcing subtrate 30, on the surface of the passage-forming substrate 10 opposite to the surface thereof on which the piezoelectric elements 300 are formed. Therefore, it becomes possible to prevent damage to the piezoelectric elements 300 due to the heat in forming the insulation film 55, as well as deterioration in sealing performance of the piezoelectric element holding portion 31 due to degradation of the adhesive agent which adheres the passage-forming substrate 10 and the reinforcing subtrate 30. In addition, the pressure generating chambers 12 can be formed with high precision by using the insulation film 55 as a mask.

Moreover, when each of the pressure generating chambers 12 is formed by anisotropic etching, part of the passage-forming substrate 10 in a region corresponding to the insulation film 55 is side-etched, thus forming an overhanging portion 55*b* which overhangs in a region corresponding to the pressure generating chamber 12. Although the overhanging portion 55*b* may remain, the overhanging portion 55*b* is removed in this embodiment (see FIG. 6D). A method of removing the overhanging portion 55*b* may be, but is not particularly limited to, etching or the like. However, it is preferable to remove the overhanging portion 55*b* by dry etching using etching gas essentially containing tetrafluoromethane ($CF_4$) or trifluoromethane ($CHF_3$), in the case where the aforementioned material is used for the insulation film 55. It is also preferable to remove the insulation film 55 together with the insulation film 55*b*.

In this way, when removing the overhanging portion 55*b*, the elastic film 50 that constitutes the bottom surface of the pressure generating chamber 12 is prevented from being removed together. Even if elastic film 50 was etched simultaneously with the overhanging portion 55*b*, the etched elastic film 50 is limited to an extremely small amount. Note that removal of the overhanging portion 55*b* and the insulation film 55 in the above-described way is effective when the elastic film 50 constituting one surface of the pressure generating chamber 12 is made of silicon dioxide as in this embodiment, and further, it is particularly effective when silicon nitride or tantalum oxide is used for the insulation film 55.

Figure 7A:
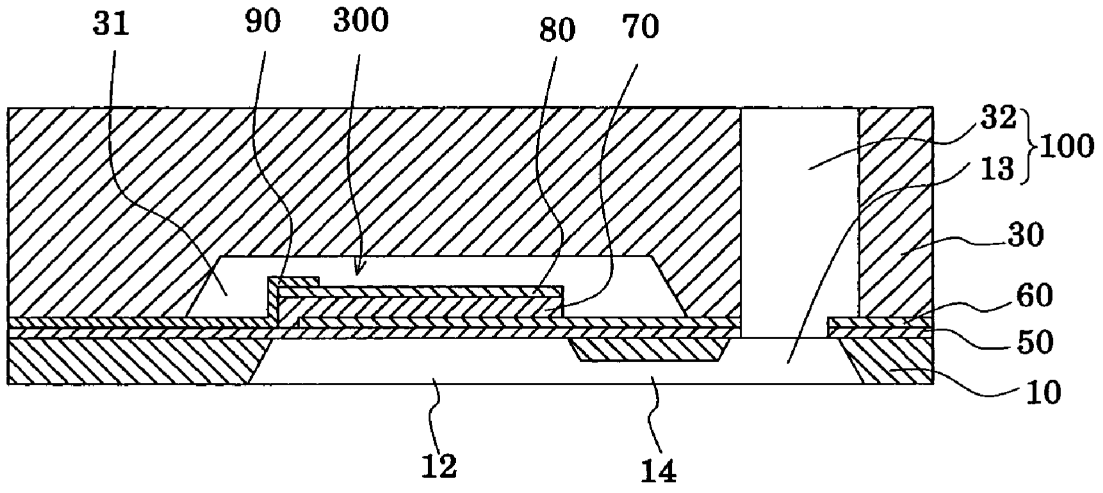
FIGS. 7A and 7B are sectional views showing manufacturing steps of the recording head according to Embodiment 1.
Figure 7B:
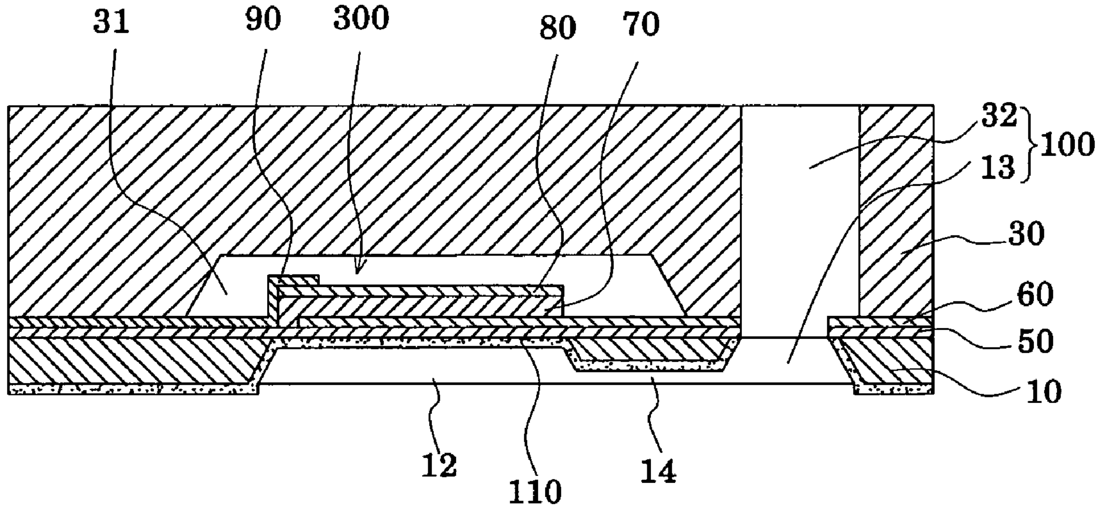

Subsequently, as shown in FIG. 7A, the elastic film 50 and the lower electrode film 60 in a region corresponding to the communicating portion 13 are removed by, for example, laser processing so that the communicating portion 13 and a reservoir portion 32 communicate with each other to form a reservoir 100. Thereafter, as shown in FIG. 7B, an ink-resistant protective film 110, made of an ink-resistant material, may be provided on an inner surface of each pressure generating chamber 12 and in a region where the insulation film 55 was formed. When providing the ink-resistant protective film 110 as above, it is preferable to previously remove the insulation film 55 and the overhanging portion 55*b* by dry etching as described earlier. This facilitates the formation of the ink-resistant protective film 110.

After the formation of the pressure generating chambers 12, a compliance plate 40 is joined onto the reinforcing subtrate 30 with an adhesive agent or the like, and further, a nozzle plate 20 in which nozzle orifices 21 are drilled is joined onto the surface of the passage-forming substrate 10 opposite to the reinforcing subtrate 30 side. Thus, the ink-jet recording head of this embodiment is formed. In practice, a large number of chips are simultaneously formed on a wafer by the foregoing series of deposition and anisotropic etching. After the processing is completed, the wafer is divided into the passage-forming substrates 10, each having a chip size as shown in FIG. 1.

Embodiment 2

Figure 8A:
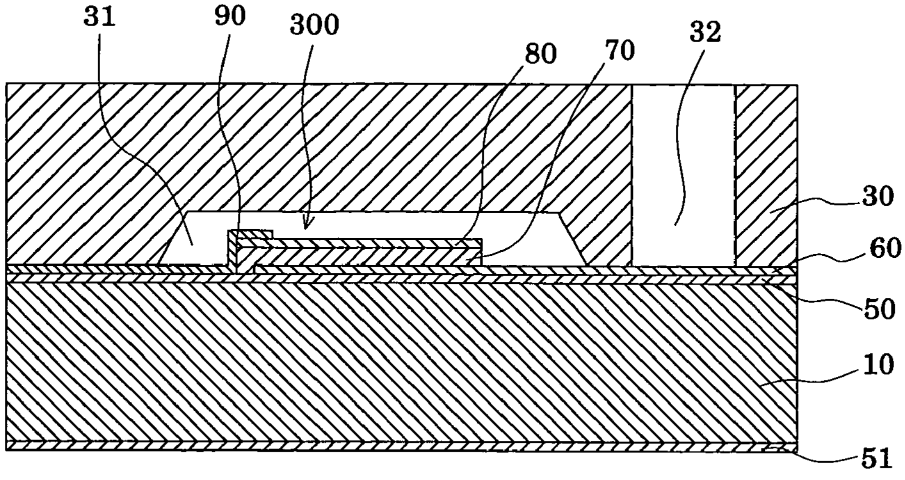
FIGS. 8A to 8C are sectional views showing manufacturing steps of a recording head according to Embodiment 2.
Figure 8B:
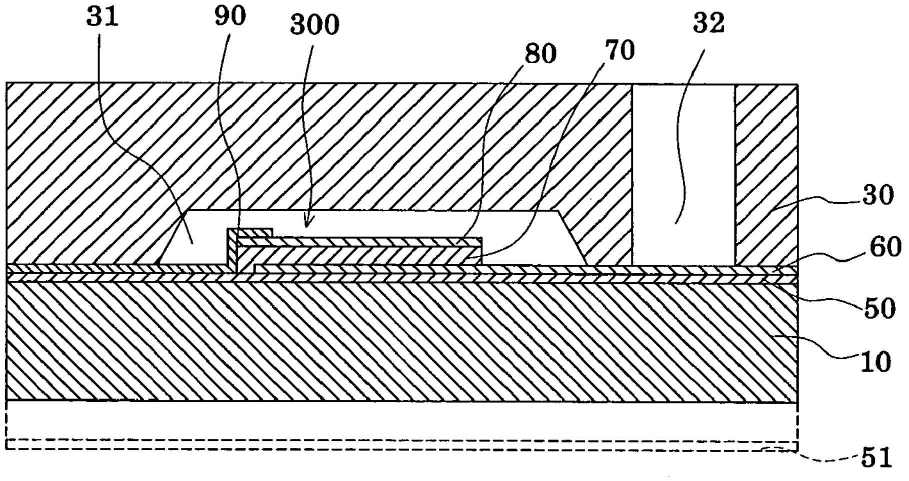
Figure 8C:
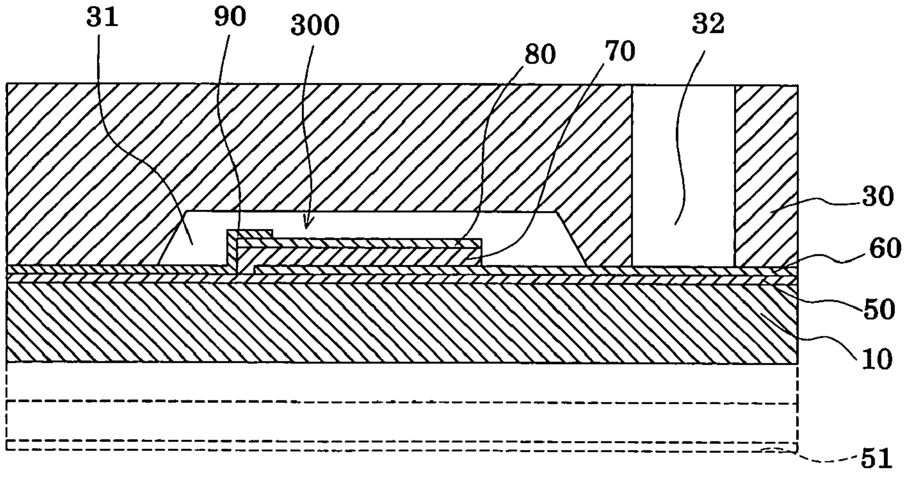

FIGS. 8A to 8C are sectional views of a pressure generating chamber in a longitudinal direction thereof, showing a method of manufacturing an ink-jet recording head according to Embodiment 2. The method of manufacturing the ink-jet recording head of this embodiment is the same as aforementioned Embodiment 1, except the step of forming a passage-forming substrate 10 to have a predetermined thickness. Therefore, description of the duplicated steps is omitted.

First of all, as shown in FIG. 8A, a reinforcing substrate 30 is joined onto a surface which is provided with piezoelectric elements 300, the surface being on the passage-forming substrate 10 on which the piezoelectric elements 300 are formed. Next, as shown in FIG. 8B, the passage-forming substrate 10, onto which the reinforcing subtrate 30 is joined, is ground or polished on the surface thereof opposite to the surface where the piezoelectric elements 300 are formed. Thus, the passage-forming substrate 10 is formed to have a certain thickness. Since the grinding or polishing of the passage-forming substrate 10 applies stress thereto, thinning of the passage-forming substrate 10 reduces rigidity thereof. Therefore, the passage-forming substrate 10 is easily deformed with flexibility toward a piezoelectric element holding portion 31, since a region corresponding to the piezoelectric element holding portion 31 in the passage-forming substrate 10 is hollowed. Accordingly, there is a possibility of unevenness of the thickness of the passage-forming substrate 10. In addition, there is another possibility that an affected layer with a microcrack and the like is formed in the passage-forming substrate 10 due to grinding or polishing.

Considering the above, a grinding amount of the passage-forming substrate 10 is set to an amount such that the passage-forming substrate 10 can be ground or polished without deforming the region of the passage-forming substrate 10, the region corresponding to the piezoelectric element holding portion 31. In addition, the grinding amount of the passage-forming substrate 10 is set to an amount to leave a thickness which allows the affected layer with a microcrack and the like occurred due to grinding or polishing to be removed in a later-described wet etching step. In this embodiment, the passage-forming substrate 10 has a thickness of about 220 μm at the point when the reinforcing subtrate 30 is adhered thereto, and therefore the passage-forming substrate 10 is thinned to 100 μm thick by grinding or polishing thereof.

Next, as shown in FIG. 8C, the passage-forming substrate 10 is treated with an etching solution on the surface thereof opposite to the piezoelectric elements 300 side, while the passage-forming substrate 10 is rotated in an in-plane direction of the surface thereof opposite to the surface where the piezoelectric elements 300 are provided, similarly to the earlier-mentioned Embodiment 1. Thus, the passage-forming substrate 10 is made to have a predetermined thickness. During the wet etching, similarly to aforementioned Embodiment 1, no stress is applied to the passage-forming substrate 10. Moreover, the etching solution can be uniformly spread over the surface of the passage-forming substrate 10. Therefore, the passage-forming substrate 10 having a uniform thickness can be easily formed with high precision. Even if the affected layer with a microcrack and the like is formed in the passage-forming substrate 10 when ground or polished, the affected layer can be surely removed by the wet etching.

As described above, in this embodiment, the passage-forming substrate 10 is wet-etched after being ground or polished when forming the passage-forming substrate 10 to have a predetermined thickness. Therefore, the passage-forming substrate 10 having a uniform thickness without an affected layer can be formed in a short period of time.

Subsequent steps of forming pressure generating chambers 12, a communicating portion 13 and ink supply paths 14, as well as steps of joining a nozzle plate 20 and a compliance plate 40 to the passage-forming substrate 10 and reinforcing subtrate 30, respectively, are the same as those in the foregoing Embodiment 1. Therefore, duplicated description is omitted.

Other Embodiments

Hereinbefore, the method of manufacturing the liquid jet head of the present invention has been described. Needless to say, however, the present invention is not limited to the foregoing embodiments. For example, in the aforementioned Embodiments 1 and 2, after the pressure generating chambers 12, the communicating portion 13 and the ink supply paths 14 are formed, the compliance plate 40 is joined onto the reinforcing subtrate 30. Nevertheless, the steps are not limited to this order, and it is possible to join the compliance plate 40 to the reinforcing subtrate at the same time as when the reinforcing subtrate 30 is joined to the passage-forming substrate 10, for example.

Figure 9A:
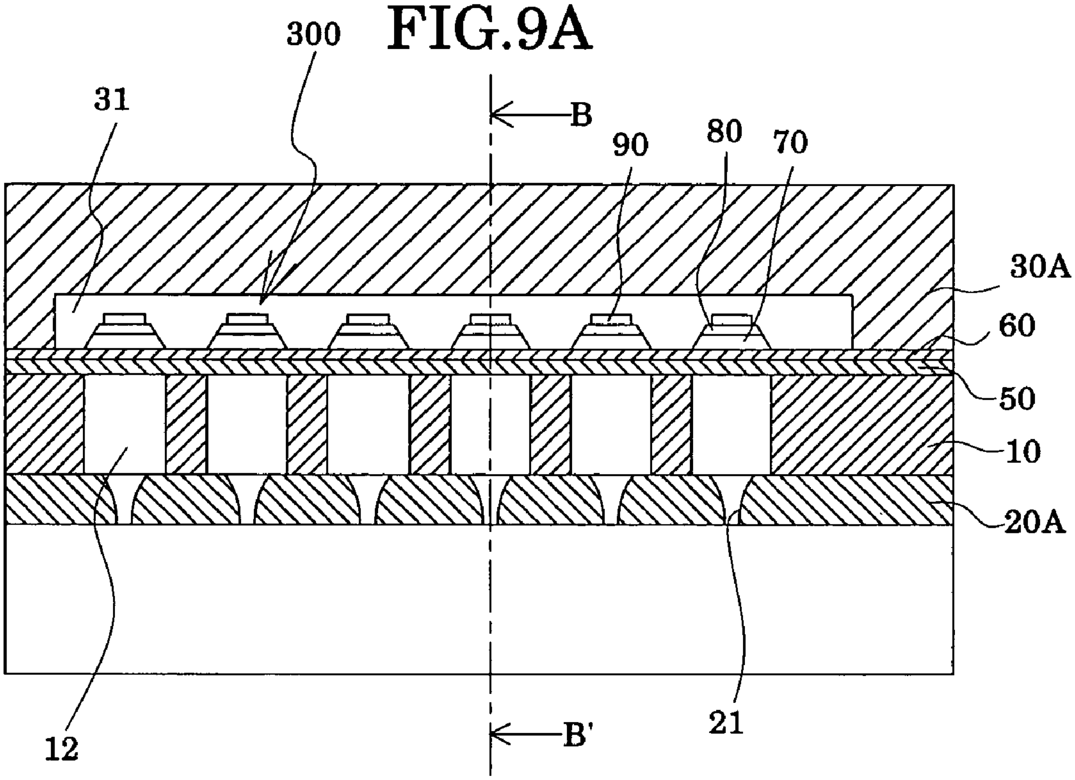
FIGS. 9A and 9B are sectional views of a recording head according to another embodiment.
Figure 9B:
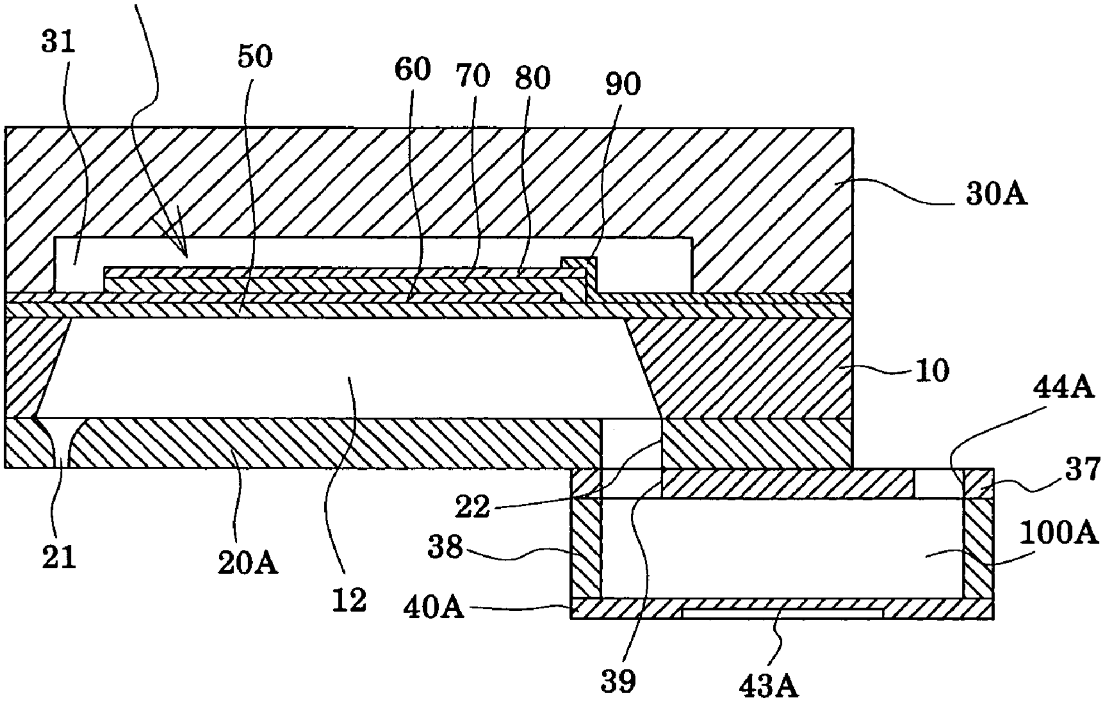

Moreover, in the foregoing Embodiments 1 and 2, exemplified is the ink-jet recording head in which the reservoir 100 is provided on the piezoelectric elements 300 side. However, a basic structure of the ink-jet recording head is not particularly limited to this. Here, another example of the ink-jet recording head is shown in FIGS. 9A and 9B. FIG. 9A is a sectional view of pressure generating chambers of the ink-jet recording head in an array direction of the pressure generating chambers, and FIG. 9B is a sectional view taken along the line B-B' of FIG. 9A. As shown in FIGS. 9A and 9B, a reinforcing subtrate 30A having a piezoelectric element holding portion 31 is joined to a passage-forming substrate 10 of the ink-jet recording head on a piezoelectric elements 300 side, while the piezoelectric element holding portion 31 ensures a space in a region corresponding to piezoelectric elements 300. The piezoelectric element holding portion 31 is capable of sealing the space which does not interfere with movement of the piezoelectric elements 300.

Moreover, the pressure generating chambers 12 and a later-described reservoir 100 are allowed to communicate with each other through ink supply ports 22 which are formed in a nozzle plate 20A at positions corresponding to one ends of the respective pressure generating chambers 12. Ink is supplied from the reservoir 100A through the ink supply ports 22 and distributed to each of the pressure generating chambers 12.

To a region corresponding to the ink supply ports 22 on the nozzle plate 20A, an ink chamber side plate 37, an ink chamber forming plate 38 and a compliance plate 40A, which form the reservoir 100A, are joined.

The ink chamber side plate 37 is joined so as to protrude outward beyond an end of the passage-forming substrate 10, while a surface of the ink chamber side plate 37 opposite to a joined surface thereof constitutes one side of the reservoir 100A. In this ink chamber side plate 37, ink supply communicating ports 39 which communicate with the respective ink supply ports 22 are formed. In the protruding region of the ink chamber side plate 37, an ink introducing port 44A, which receives ink supply from outside, is formed, while penetrating the ink chamber side plate 37 in its thickness direction.

The ink chamber forming plate 38 forms a peripheral wall of the reservoir 100A, and is formed of a punched stainless steel plate having an appropriate thickness in accordance with the number of nozzle orifices and ink droplet ejection frequency. The compliance plate 40A is made of a stainless steel plate or the like, and one surface thereof constitutes one side of the reservoir 100A. An opening portion 43A in a concave shape is formed on part of the other surface of the compliance plate 40A by half etching. By thinning the compliance plate 40A, the opening portion 43A absorbs pressures which are generated when ejecting ink droplets and directed toward the opposite side to the nozzle orifices 21. The opening portion 43A prevents excessive positive or negative pressures from being applied to the other pressure generating chambers 12 through the reservoir 100A.

In the ink-jet recording head of this kind, similarly to Embodiments 1 and 2 described earlier, the passage-forming substrate 10 is formed to have a predetermined thickness by wet etching in the manufacture thereof. Thus, the passage-forming substrate 10 with a uniform thickness is formed, and thereby good junction of the nozzle plate 20A and the like to the passage-forming substrate 10 can be realized.

Furthermore, in the foregoing Embodiments 1 and 2, when processing the passage-forming substrate 10 on which the reinforcing subtrate 30 is adhered, to a predetermined thickness, the passage-forming substrate 10 is treated with an etching solution while being rotated. However, the method is not limited to this, and the passage-forming substrate 10 may be processed to have a predetermined thickness only by grinding or polishing.

In addition, in the foregoing Embodiments 1 and 2, the piezoelectric element holding portions 31 are provided respectively to the reinforcing substrates 30 and 30A, and thereby the piezoelectric elements 300 are designed to be sealed by the piezoelectric element holding portions 31. However, the method is not limited to this, and for example, the piezoelectric elements 300 may not have to be designed to be sealed by the piezoelectric element holding portion 31. Such an example will be shown in FIGS. 10A and 10B. Incidentally, FIG. 10A is a plan view of an ink-jet recording head according to yet another embodiment, and FIG. 10B is a sectional view taken along the A-A' line of FIG. 10A.

Figure 10A:
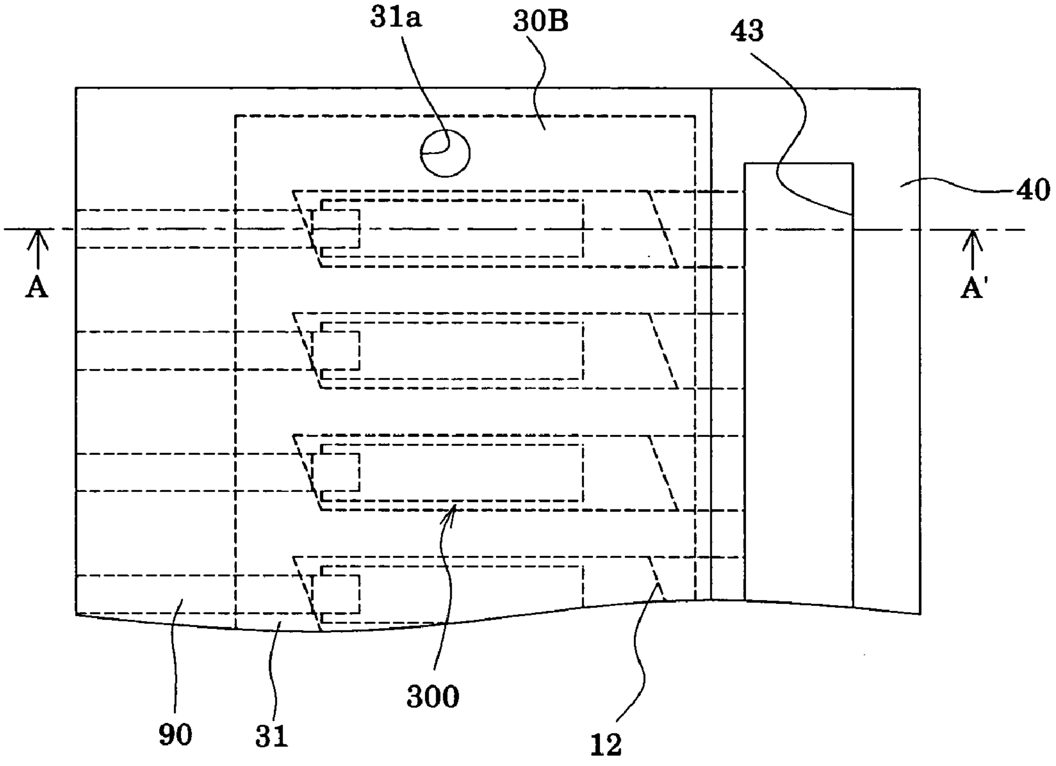
FIGS. 10A and 10B are a plan view and a sectional view of a recording head according to yet another embodiment.
Figure 10B:
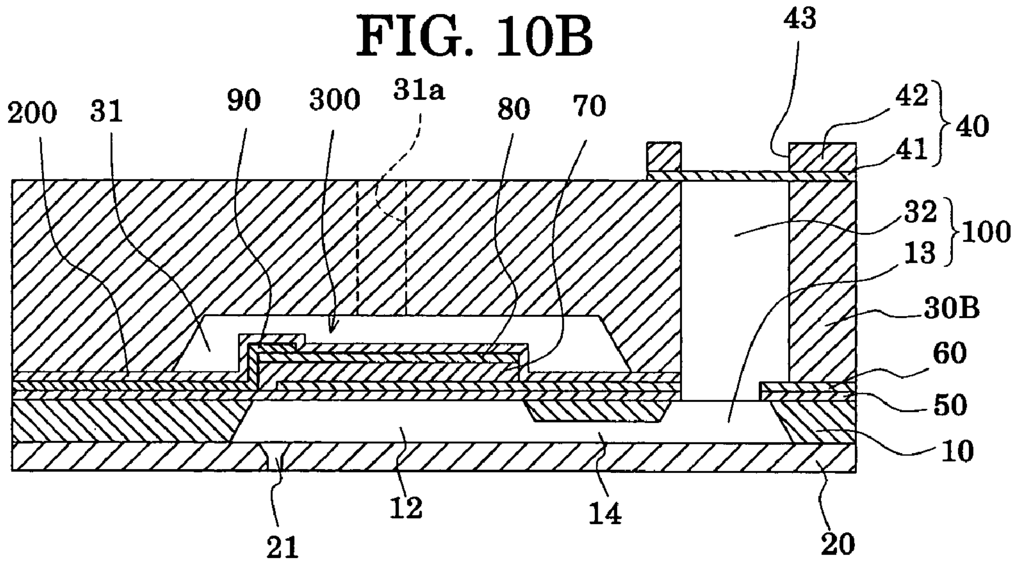

As shown in FIGS. 10A and 10B, a reinforcing substrate 30B is provided with an open-to-atmosphere port 31*a*, one end of which communicates with the piezoelectric element holding portion 31, and the other end of which is open to the atmosphere. In other words, the piezoelectric element holding portion 31 does not seal the piezoelectric elements 300 completely, and is open to the atmosphere through the open-to-atmosphere port 31*a*.

It should be noted that, in a case where the piezoelectric elements 300 are not designed to be sealed with the piezoelectric element holding portion 31 in this manner, it is preferable that the piezoelectric elements 300 and the lead electrode 90 on the passage-forming substrate 10 be covered with an insulation film 200 made of an inorganic insulating material as shown in FIGS. 10A and 10B. As a material for such an insulting film 200, aluminium oxide ($Al_2O_3$), tantalum pentoxide ($Ta_2O_5$), silicon dioxide ($SiO_2$) and the like can be listed, but it is preferable that aluminium oxide ($Al_2O_3$) be used for the material. In particular, if aluminium oxide is to be used, moisture would be able to be prevented from permeating sufficiently in a highly humid environment even though the insulation film is formed of a thin film with a thickness of approximately 100 nm. It goes without saying that the piezoelectric elements 300 may be sealed with the insulation film 200, and that additionally the piezoelectric elements 300 may be sealed with the piezoelectric element holding portion 31 on the reinforcing substrate 30.

Furthermore, FIGS. 10A and 10*b* show the example in which the reinforcing substrate 30B is provided with the open-to-atmosphere port 31*a* so that the piezoelectric elements 300 are not sealed with the piezoelectric element holding portion 31 completely. However, the method is not limited to this, and for example, the reinforcing substrate does not have to be provided with the piezoelectric elements. In other words, the reinforcing substrate may be provided with a through-hole which has the same area as the piezoelectric element holding portion does, and which penetrates in the thickness direction. Alternatively, the reinforcing substrate may be provided with neither the reservoir part nor the piezoelectric element holding portion.

Moreover, in the foregoing embodiments, an ink-jet recording head for printing predetermined images or characters on a printing medium is described as an example of a liquid jet head. However, as a matter of course, the present invention is not limited to this, and may be applied to other liquid jet heads such as: a color material jet head used for manufacturing color filters of a liquid crystal display and the like; an electrode material jet head used for forming electrodes of an organic EL display, a field emission display (FED) and the like; a bio-organic matter jet head used for manufacturing biochips; and the like.

What is claimed is:

1. A method of manufacturing a liquid jet head including a passage-forming substrate which is made of a single crystal silicon substrate and in which at least one pressure generating chamber communicating with at least one nozzle orifice is defined, and at least one piezoelectric element which is provided on the passage-forming substrate through a vibration plate and made of a lower electrode, a piezoelectric layer and an upper electrode, the method comprising the steps of:

forming the vibration plate and the piezoelectric element on one surface of the passage-forming substrate;

thermally adhering with adhesive onto the passage-forming substrate a reinforcing substrate for reinforcing the rigidity of the passage-forming substrate;

processing the passage-forming substrate to have a predetermined thickness;

depositing an insulation film on the other surface of the passage-forming substrate at lower temperature than that for adhering the passage-forming substrate and the reinforcing substrate together, and patterning the insulation film into a predetermined shape; and etching the passage-forming substrate using the patterned insulation film as a mask to form the pressure generating chamber.

2. The method of manufacturing a liquid jet head according to claim 1, wherein a piezoelectric element holding portion, which is capable of reserving a space large enough not to hinder the motion of the piezoelectric element, is formed in an area facing the piezoelectric element on the reinforcing substrate.

3. The method of manufacturing a liquid jet head according to claim 2, wherein the reinforcing substrate causes the piezoelectric element holding portion to seal the piezoelectric element.

4. The method of manufacturing a liquid jet head according to claim 1, wherein the step of forming the piezoelectric element comprises a step of covering the piezoelectric element with an insulation film made of an inorganic insulation material.

5. The method of manufacturing a liquid jet head according to claim 1, wherein a reservoir part to constitute parts of a reservoir which is a liquid chamber is shared by all the pressure generating chambers.

6. A method of manufacturing a liquid jet head including a passage-forming substrate which is made of a single crystal silicon substrate and in which at least one pressure generating chamber communicating with at least one nozzle orifice is defined, and at least one piezoelectric element which is provided on the passage-forming substrate through a vibration plate and made of a lower electrode, a piezoelectric layer and an upper electrode, the method comprising the steps of:

forming the vibration plate and the piezoelectric element on one surface of the passage-forming substrate;

thermally adhering with epoxy adhesive onto the passage-forming substrate a reinforcing substrate for reinforcing the rigidity of the passage-forming substrate;

processing the passage-forming substrate to have a predetermined thickness;

depositing an insulation film on the other surface of the passage-forming substrate at lower temperature than that for adhering the passage-forming substrate and the reinforcing substrate together, and patterning the insulation film into a predetermined shape; and etching the passage-forming substrate using the patterned insulation film as a mask to form the pressure generating chamber.

7. The method of manufacturing a liquid jet head according to claim 1, wherein at least a lowermost layer of the vibration plate is formed of a thermal oxide film and one surface of the pressure generating chamber includes the thermal oxide film.

8. The method of manufacturing a liquid jet head according to claim 1, wherein one of an ECR sputtering method and an ion assisted deposition method is used in the step of forming the insulation film.

9. A method of manufacturing a liquid jet head including a passage-forming substrate which is made of a single crystal silicon substrate and in which at least one pressure generating chamber communicating with at least one nozzle orifice is defined, and at least one piezoelectric element which is provided on the passage-forming substrate through a vibration plate and made of a lower electrode, a piezoelectric layer and an upper electrode, the method comprising the steps of:

forming the vibration plate and the piezoelectric element on one surface of the passage-forming substrate;

thermally adhering onto the passage-forming substrate a reinforcing substrate for reinforcing the rigidity of the passage-forming substrate;

processing the passage-forming substrate to have a predetermined thickness;

depositing an insulation film on the other surface of the passage-forming substrate at lower temperature than that for adhering the passage-forming substrate and the reinforcing substrate together, and patterning the insulation film into a predetermined shape;

etching the passage-forming substrate using the patterned insulation film as a mask to form the pressure generating chamber, and concurrently forming an overhanging portion by removing part of the passage-forming substrate in a region where the insulation film is formed so that the insulation film overhangs in a region corresponding to the pressure generating chamber; and removing the overhanging portion after the step of forming the pressure generating chamber.

10. A method of manufacturing a liquid jet head including a passage-forming substrate which is made of a single crystal silicon substrate and in which at least one pressure generating chamber communicating with at least one nozzle orifice is defined, and at least one piezoelectric element which is provided on the passage-forming substrate through a vibration plate and made of a lower electrode, a piezoelectric layer and an upper electrode, the method comprising the steps of:

forming the vibration plate and the piezoelectric element on one surface of the passage-forming substrate;

thermally adhering onto the passage-forming substrate a reinforcing substrate for reinforcing the rigidity of the passage-forming substrate;

processing the passage-forming substrate to have a predetermined thickness;

depositing an insulation film on the other surface of the passage-forming substrate at lower temperature than that for adhering the passage-forming substrate and the reinforcing substrate together, and patterning the insulation film, which is made of any one material of silicon nitride, tantalum oxide, alumina, zirconia, and titania, into a predetermined shape; and etching the passage-forming substrate using the patterned insulation film as a mask to form the pressure generating chamber.

11. The method of manufacturing a liquid jet head according to claim 10 herein the insulation film is patterned by dry etching using etching gas which essentially contains one of tetrafluoromethane ($CF_4$) and trifluoromethane ($CHF_3$).

12. A method of manufacturing a liquid jet head including a passage-forming substrate which is made of a single crystal silicon substrate and in which at least one pressure generating chamber communicating with at least one nozzle orifice is defined, and at least one piezoelectric element which is provided on the passage-forming substrate through a vibration plate and made of a lower electrode, a piezoelectric layer and an upper electrode, the method comprising the steps of:

forming the vibration plate and the piezoelectric element on one surface of the passage-forming substrate;

thermally adhering onto the passage-forming substrate a reinforcing substrate for reinforcing the rigidity of the passage-forming substrate;

processing the passage-forming substrate to have a predetermined thickness, wherein the passage forming substrate is treated with an etching solution on other surface thereof opposite to one surface thereof on which the piezoelectric element is provided, while the passage-forming substrate is rotated in an in-plane direction of the other side thereof;

depositing an insulation film on the other surface of the passage-forming substrate at lower temperature than that for adhering the passage-forming substrate and the reinforcing substrate together, and patterning the insulation film into a predetermined shape; and etching the passage-forming substrate using the patterned insulation film as a mask to form the pressure generating chamber.

13. The method of manufacturing a liquid jet head according to claim 12, wherein in the step of processing the passage-forming plate to have a predetermined thickness, the other surface of the passage-forming substrate is treated with the etching solution after being ground or polished.

14. The method of manufacturing a liquid jet head according to claim 12, wherein the etching solution is made of a liquid mixture of hydrofluoric acid and nitric acid.

15. The method of manufacturing a liquid jet head according to any one of claims 1 to 14, wherein each of the steps is conducted on a single crystal silicon wafer which is to be divided into the passage-forming substrates, and thereafter the single crystal silicon wafer is divided.

16. The method of manufacturing a liquid head according to any one of claims 1 to 14, further comprising the step of adhering a nozzle plate, in which at least one nozzle orifice is drilled, to the other surface of the passage-forming substrate in which the pressure generating chamber is formed.

17. The method of manufacturing a liquid head according to claim 15, further comprising the step of adhering a nozzle plate, in which at least one nozzle orifice is drilled, to the other surface of the passage-forming substrate in which the pressure generating chamber is formed.

* * * * *